UNITED STATES PATENT OFFICE.

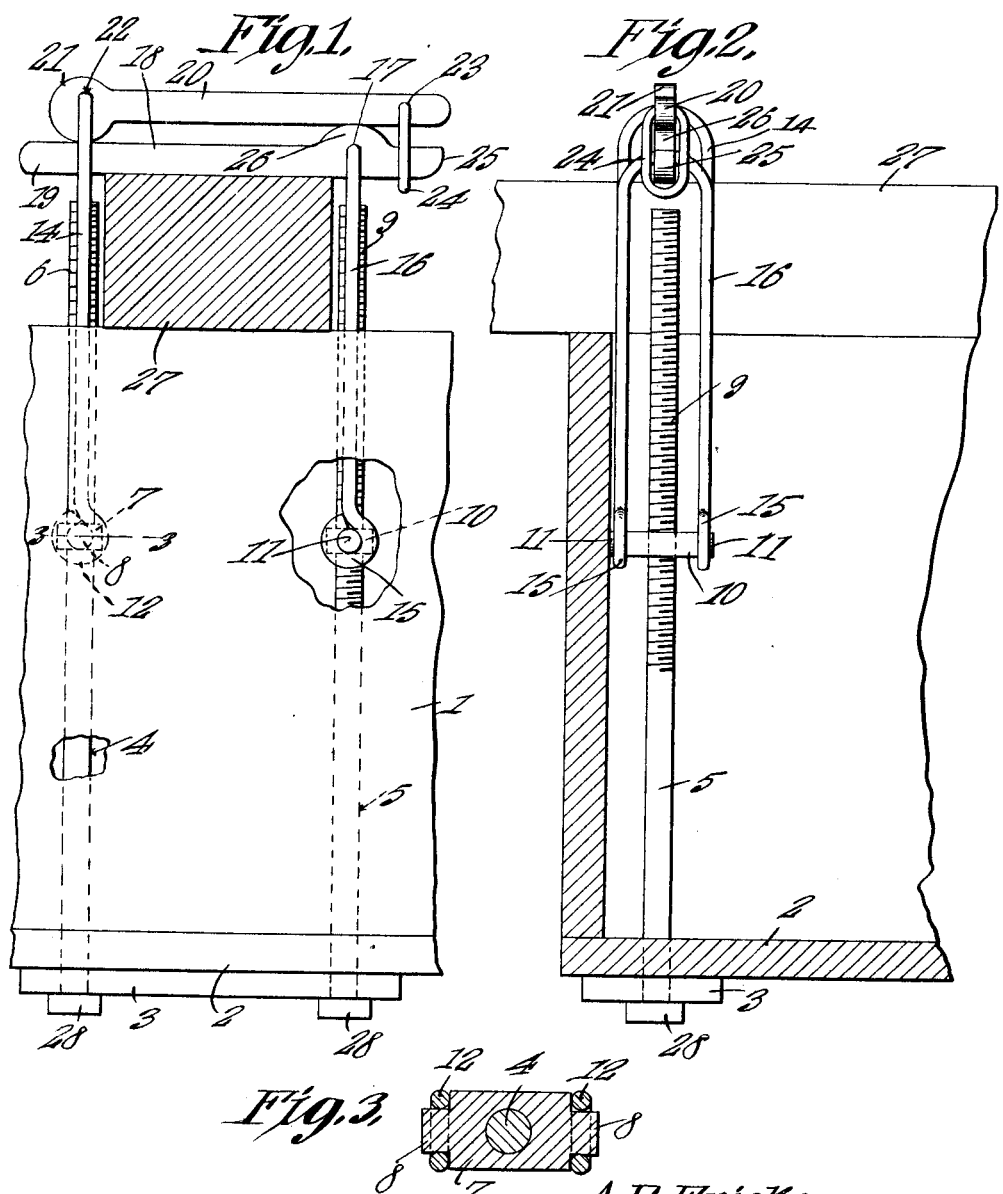

AXEL RUDOLPH ERICKSON, OF VERNDALE, MINNESOTA.

WAGON-CLAMP.

1,179,416.  Specification of Letters Patent.  Patented Apr. 18, 1916.

Application filed October 12, 1915. Serial No. 55,474.

*To all whom it may concern:*

Be it known that I, AXEL RUDOLPH ERICKSON, a citizen of the United States, residing at Verndale, in the county of Wadena and State of Minnesota, have invented a new and useful Wagon-Clamp, of which the following is a specification.

The device forming the subject matter of this application is adapted to be employed for assembling a hay rack or like structure with a wagon box or body.

The invention aims to provide a novel structure whereby the rails of a hay rack may be detachably held on the wagon box, the construction being such that the holding means which maintains the rack on the box, may be dropped down into an out-of-the-way position when not in use.

Another object of the invention is to provide a structure of this type which is longitudinally extensible, so as to coact properly with wagon boxes, the side walls of which are of different heights.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in sectional side elevation, a wagon box and a hay rack to which the device forming the subject matter of this application has been assembled; Fig. 2 is a cross section through the wagon box, the holding device appearing in elevation; Fig. 3 is a cross section taken approximately on the line 3—3 of Fig. 1, the wagon box being omitted.

In the drawings there is shown a wagon box embodying a side board 1 and a bottom 2, the numeral 27 indicating one rail of a hay rack, resting on the upper edge of the side board 1.

In carrying out the present invention there is provided a foot plate 3 resting against the lower face of the bottom 2 of the wagon box. Passing slidably upward through the foot plate 3 and through the bottom 2 are rods 4 and 5 provided at their lower ends with heads 28 bearing against the under face of the foot plate 3 to limit the upward movement of the rods.

The rod 4 is threaded as indicated at 6 to receive an adjustable member in the form of a nut 7 having trunnions 8. The rod 5 is threaded as shown at 9 to receive an adjustable member in the form of a nut 10 having trunnions 11. The trunnions 8 of the nut 7 receive eyes 12 formed at the lower end of a U-shaped bail 14, the trunnions 11 of the nut 10 receiving eyes 15 formed at the lower end of a U-shaped bail 16. The intermediate portion of the bail 16 is pivotally mounted as shown at 17 in a holding bar 18, resting on top of the rail 27, one end of the holding bar 18 passing through the bail 14, as shown at 19, the bail 14 thus constituting a means for limiting the lateral movement of the holding bar 18.

The invention comprises a clamp bar 20 provided at one end with a cam 21 pivoted as shown at 22 on the intermediate portion of the bail 14 and adapted to coact with the holding bar 18 near its end 19. Pivoted as shown at 23 to the clamp bar 20 is a link 24, one end of the clamp 20 being rounded as shown at 25, so that the link 24 may pass beneath the bar 18 at one end. Upstanding from the bar 18 is a boss 26 on which the bar 20 rests.

In practical operation, the holding bar 20 is swung across the top of the rack rail 27, the bail 14 is swung into the position shown in Fig. 1, the right hand end of the bar 20 is swung downwardly until it abuts against the boss 26, the cam 21 engaging the bar 18 and, finally the link 24 is engaged with the rounded end 25 of the bar 18, as clearly shown in Fig. 1, whereupon the rack rail 27 will be held down securely on the upper edge of the side board 1 of the wagon box.

It is to be observed that when the occasion for the use of the structure has passed, the same is adapted to assume a lowered position, beneath the upper edge of the side board 1, the rods 4 and 5 sliding downwardly through the bottom 2 of the wagon box.

Owing to the fact that the nuts 10 and 7 are threaded onto the respective rods, for vertical adjustment, the structure is adapted for use upon wagon boxes, the side boards 1 of which are of different heights. Because the end 19 of the holding bar 18 lies between the side arms of the bail 14, a lateral movement of the bar 18, beyond predetermined limits is prevented. The boss 26 exercises two functions. First, it serves to reinforce the bar 18 above the opening through which the intermediate portion of the bail 16 passes; and secondly, it acts as an abutment on which the bar 20 is adapted to rest.

Having thus descibed the invention, what is claimed is:—

1. The combination with a wagon body comprising a bottom and a side, and a rack comprising a rail resting on the side, of a foot plate applied to the lower face of the bottom; a pair of rods passing slidably upward through the bottom and through the foot plate and provided at their lower ends with heads engaging the foot plate, the upper ends of the rods being threaded; nuts on the threaded portions of the rods and provided with trunnions; U-shaped bails lying upon opposite sides of the rail and having eyes pivotally mounted upon the trunnions; a holding bar pivoted intermediate its ends on one bail and resting on the rail, one end of the bar passing through the other bail, and the other end of the bar being rounded, the bar being provided with a boss located above the bail to which the bar is pivoted; a clamp bar resting on the boss and provided at one end with a cam engaging the holding bar and pivoted on said other bail; and a link pivoted to the other end of the clamp bar and adapted to coact with the rounded end of the holding bar to prevent relative movement between the bars and to maintain the cam engaged with the holding bar.

2. The combination with a wagon body comprising a bottom and a side, and a rack comprising a rail resting on the side, of a pair of rods passing slidably through the bottom and adapted to be moved downwardly therethrough; means for limiting the upward movement of the rods; nuts threaded on the rods; bails pivoted to the nuts and lying on opposite sides of the rail; a holding bar pivoted to one bail and passing through the other bail; a clamp bar comprising a cam pivoted on said other bail and engaging the holding bar; and a link pivoted to one rod and adapted to engage the other rod, to prevent relative movement between the rods.

3. In a device for attaching a hay rack to a wagon box, a pair of rods; nuts threaded onto the rods; bails pivoted to the nuts; oppositely extended bars pivoted to the bails, one bar having a cam coacting with the other bar; and means for preventing relative movement between the bars.

4. In a device for attaching a rack to a wagon box, a pair of rods; nuts threaded onto the rods; bails pivoted to the rods; a holding bar pivoted to one bail and provided with a boss; a clamp bar comprising a cam pivoted to the other bail and coacting with the holding bar, the clamp bar resting on the boss; and a link pivoted to the clamp bar and coacting with one end of the holding bar.

5. In a device for attaching a hay rack to a wagon box, a pair of rods; adjustable members movable along the rods; bails pivoted to the adjustable members; oppositely extended bars pivoted to the bails, one bar having a cam coacting with the other bar; and means for preventing relative movement between the bars.

In testimony that I claim the foregoing as my own, I have hereto affixed my signature in the presence of two witnesses.

AXEL RUDOLPH ERICKSON.

Witnesses:
E. N. FRAZIER,
W. N. MORELL, Jr.

Copies of this patent may be obtained for five cents each, by addressing the "Commissioner of Patents, Washington, D. C."